US012528210B2

(12) United States Patent
Asmari et al.

(10) Patent No.: US 12,528,210 B2
(45) Date of Patent: Jan. 20, 2026

(54) AUTONOMOUS COLLABORATIVE ROBOTIC SYSTEM AND METHOD

(71) Applicant: ULC Technologies LLC, Hauppauge, NY (US)

(72) Inventors: Ali Asmari, Center Moriches, NY (US); Guoxuan Zhang, Hauppauge, NY (US); Sergio Flores, Union City, NJ (US); Mersim Redzematovic, Lynbrook, NY (US)

(73) Assignee: ULC Technologies LLC, Hauppauge, NY (US)

( * ) Notice: Subject to any disclaimer, the term of this patent is extended or adjusted under 35 U.S.C. 154(b) by 44 days.

(21) Appl. No.: 18/740,795

(22) Filed: Jun. 12, 2024

(65) Prior Publication Data

US 2024/0408773 A1     Dec. 12, 2024

Related U.S. Application Data

(60) Provisional application No. 63/507,648, filed on Jun. 12, 2023.

(51) Int. Cl.
*B25J 19/02* (2006.01)
*B25J 5/00* (2006.01)
*B25J 19/00* (2006.01)
*G01C 21/00* (2006.01)

(52) U.S. Cl.
CPC ............ *B25J 19/023* (2013.01); *B25J 5/007* (2013.01); *B25J 19/005* (2013.01); *B25J 19/022* (2013.01); *G01C 21/3811* (2020.08); *G01C 21/3841* (2020.08)

(58) Field of Classification Search
CPC ........ B25J 19/023; B25J 5/007; B25J 19/005; B25J 19/022; G01C 21/3811; G01C 21/3841; G01C 21/383; G05D 1/2462; G05D 2105/89; G05D 2107/50; G05D 2109/10; G05D 2111/17; G05D 1/242; G05D 1/6985; F16L 2101/30; F16L 55/32
See application file for complete search history.

(56) References Cited

U.S. PATENT DOCUMENTS

| | | | |
|---|---|---|---|
| 6,671,582 B1 * | 12/2003 | Hanley | A01B 51/02 47/1.01 R |
| 7,069,124 B1 * | 6/2006 | Whittaker | G05D 1/0274 701/28 |
| 11,947,362 B1 * | 4/2024 | Alnajjar | F16L 55/1645 |
| 2006/0290779 A1 * | 12/2006 | Reverte | E03F 7/10 348/84 |
| 2007/0195712 A1 * | 8/2007 | Thayer | G06F 16/2272 370/254 |

(Continued)

*Primary Examiner* — Jason Holloway
*Assistant Examiner* — Madison B Emmett
(74) *Attorney, Agent, or Firm* — Husch Blackwell LLP

(57) ABSTRACT

An autonomous collaborative robotic system for automatically detecting, locating, and mapping underground assets is provided. The collaborative robotic system includes two autonomous robots, each robot including a housing with extendable legs, a camera module, a laser module designed to project a structure light pattern on a pipe interior, a sensor module designed to collect images from the camera module, and a processing module designed to process and stitch data to generate a network of underground assets and identify one or more features within the asset network.

20 Claims, 14 Drawing Sheets

(56) References Cited

U.S. PATENT DOCUMENTS

| | | | |
|---|---|---|---|
| 2012/0205168 A1* | 8/2012 | Flynn | B62D 55/00 |
| | | | 180/9.1 |
| 2013/0104676 A1* | 5/2013 | Yang | B25J 9/06 |
| | | | 901/44 |
| 2014/0054525 A1* | 2/2014 | Spijker | G02B 6/508 |
| | | | 254/134.3 R |
| 2014/0146161 A1* | 5/2014 | Sibai | B25J 5/007 |
| | | | 348/84 |
| 2019/0212752 A1* | 7/2019 | Fong | G05D 1/6987 |
| 2021/0278861 A1* | 9/2021 | Ben-David | G05D 1/0255 |
| 2022/0057040 A1* | 2/2022 | Yamada | F16L 55/265 |
| 2023/0371769 A1* | 11/2023 | Kwak | B25J 9/16 |
| 2024/0077426 A1* | 3/2024 | Deng | G01N 21/954 |
| 2024/0148213 A1* | 5/2024 | Kim | A47L 11/4008 |
| 2024/0151551 A1* | 5/2024 | Lawver | G01C 21/005 |

\* cited by examiner

AUTONOMOUS COLLABORATIVE ROBOTIC SYSTEM AND METHOD

CROSS-REFERENCE TO RELATED APPLICATIONS

This application claims priority to U.S. Provisional Patent Application No. 63/507,648 filed Jun. 12, 2023, which is hereby incorporated in its entirety by reference herein.

BACKGROUND

Conventional systems for mapping underground utility infrastructure, including gas pipelines, lack the ability to accurately locate assets and identify anomalies in the infrastructure. This can be especially challenging for infrastructure with smooth surfaces, like internal PVC pipe walls, or similar. Existing systems and methods lack the ability to efficiently collect data related to the internal features and defects of a pipe system without causing an interruption of utility service to users. Further, cost-effective identification and accurate objective classification of anomalies within underground infrastructures are important as many regions transition to zero-carbon alternatives like hydrogen and biomethane.

SUMMARY

A collaborative robotic system for locating and mapping underground assets is provided. The robotic system includes two or more autonomous robots, each with a housing and two or more extendable legs. The robotic system further includes a camera module, a laser module designed to project a structured light pattern, and a sensor module designed to collect images from the camera module. The robotic system also includes a processing module with a processor and a memory unit. The processing module is designed to process data collected from the sensor module. The robotic system includes a communication module designed to connect to an interface module.

In some aspects, the extendable legs are configured to be coupled to a movement device provided in the form of a wheel. Some embodiments include four extendable legs on each autonomous robot. Some forms include a power module. In some embodiments, the camera module includes a stereo camera and a monocular camera. In some aspects, the stereo camera is arranged on the first end of the autonomous robot and the monocular camera is arranged on the second end of the autonomous robot. The first end of the autonomous robot is opposite the second end of the autonomous robot. Some embodiments include a Geographic Information System (GIS) logging output system designed to map a network of underground infrastructure and identify locations of different types of underground assets. In some forms, the processing module is designed to execute a three-dimensional (3D) mapping process.

In another aspect, a method for detecting and locating underground assets using a robotic system is provided. The method can include the steps of providing a collaborative robotic system provided in the form of two autonomous robots with a laser module, a camera module, a processing module, and one or more dynamically extendable legs. The laser module is initiated as the collaborative robotic system travels through a pipe and projects a pattern of light using the laser module. In some forms, the pattern of light is projected onto an interior surface of the pipe. Image data is collected using the camera module as the collaborative robotic system travels through the pipe. The image data is processed from the camera module using the processing module. A visual output is generated of one or more underground assets identified from the data processing step. In some aspects, the visual output of the method includes a dense 3D point cloud. In some embodiments, the method further includes identifying features of the pipe using an advanced training model trained to identify assets and generating a point cloud based on a location of the autonomous robots in the underground pipe.

In another aspect, a method for detecting and locating underground assets using a collaborative robotic system is provided. The method includes initiating a laser module of a first robot of the collaborative robotic system. A pattern of light is projected on a pipe interior using the laser module of the first robot as the autonomous robotic travels through the pipe interior. Image data is collected using a camera module of a second robot as the collaborative robotic system travels through the pipe interior. Sensor data is collected using a sensor module of the first robot. The image data and the sensor data are processed using a processing module of the collaborative robotic system. One or more underground assets are identified based on the processing data step.

In some embodiments, the method also includes stitching the image data and the sensor data using the processing module. The stitched data is correlated with above-ground GIS data. A visual output is generated of a location associated with the one or more underground assets identified. Some forms include collecting a first image data using a monocular camera of the camera module and collecting a second image data using a stereo camera of the camera module. In some aspects, a GPS unit of the collaborative robotic system is launched and a global localization is determined of the one or more underground assets. The method can also include generating a 3D point cloud based on the processing of the image data and the sensor data. A hole in the 3D point cloud can be identified by an advanced training model. The global localization associated with the hole in the 3D point cloud can be determined. The method can further include stitching together one or more 3D point clouds based on the global localization of the one or more underground assets compared to the global localization determination. A visual output is generated of a network of the one or more underground assets. In some embodiments, the method includes projecting the pattern of light on the pipe interior using the first robot while the first robot remains stationary and collecting the image data using the second robot as the second robot moves away from the first robot. In some forms, the method includes identifying features of the underground assets using an advanced training model. In some embodiments, the identified features are labeled using the advanced training model. In some forms, a location of the features is determined using a GIS module of the collaborative robotic system.

DETAILED DESCRIPTION

Figure 1A:
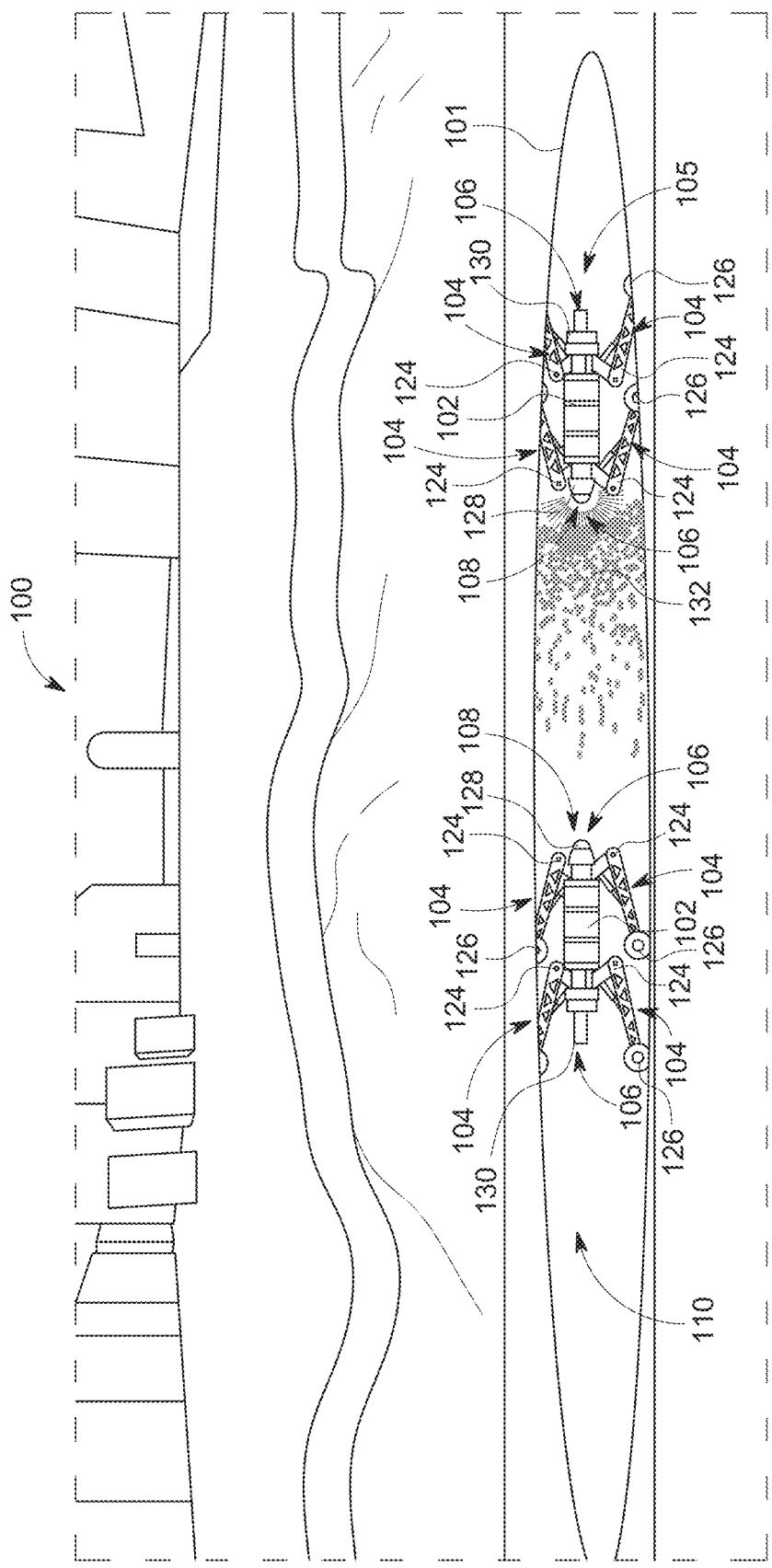
FIG. 1A is a partial side cross-sectional view of a first configuration of a collaborative robotic system as the system analyzes an interior of an underground pipe.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein are for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

Figure 1B:
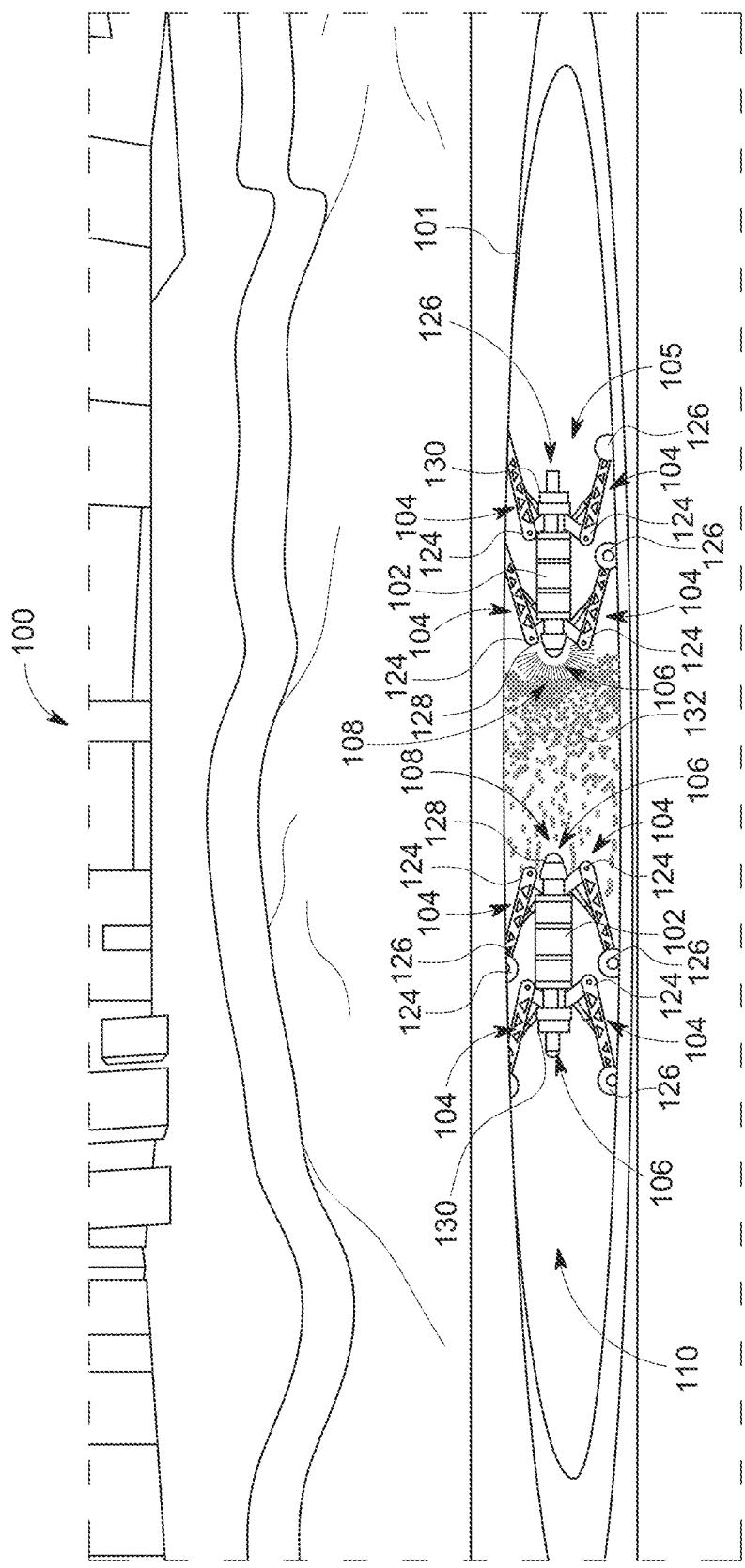
FIG. 1B is a partial side cross-sectional view of the collaborative robotic system traversing through the underground pipe of FIG. 1A.

FIG. 1A illustrates a partial cross-sectional view of a first configuration of a collaborative robotic system 100 within an underground pipe system 101. FIG. 1B illustrates the collaborative robotic system 100 of FIG. 1A traversing through the underground pipe system 101. The system 100 is designed for detecting, locating, and marking underground assets (e.g., pipes, utilities, etc.). In some embodiments, the system 100 may be autonomous, semi-autonomous, or remotely controlled by an operator or other control system. The system 100 can be provided in the form of a first robot 105 and a second robot 110. In a first configuration, the first robot 105 has the same features, subassemblies, characteristics, etc., as the second robot 110. In a second configuration (not shown), the system 100 can include more than two collaborative robots. Each of the first robot 105 and the second robot 110 of the system 100 can include a housing 102, one or more expandable legs 104, and one or more subassemblies.

The housing 102 can be provided in the form of a durable shell, case, cover, or similar, designed to protect the interior components of the robotic system 100. The housing 102 can be provided in the form of a material suitable to withstand harsh environments or environmental elements. In some embodiments, the housing 102 can be waterproof, dustproof, shockproof, electrically insulated, etc. In some embodiments, the housing 102 is constructed of metal (e.g., steel, aluminum, etc.), polymer (e.g., polycarbonate, acrylic, PVC, resin, etc.), or other durable materials.

The one or more expandable legs 104 can be provided in the form of actuated supports with one or more hinges 124 for dynamically operating (e.g., extending and contracting) the one or more expandable legs 104 as the robotic system 100 travels through pipes of varying diameters, shapes, etc. as described in more detail in connection with FIG. 2. Each of the one or more expandable legs 104 is operatively coupled to one or more wheels 126, tracks, or other forms of movable support for the system 100. In some embodiments, the wheels 126 can include one or more encoders (not shown).

The collaborative robots of the system 100 further include one or more subassemblies. In some embodiments, the subassemblies can include, but are not limited to a camera module 106, a laser module 108, a sensor module 112, a processing module 114, a communication module 116, a power module 118, an interface module 120, and a localization module 122. Additional modules and/or subassemblies may be provided in some embodiments. In some embodiments, the subassemblies are provided in the form of one or more software and/or hardware components internal to the first robot 105 and the second robot 110 (see FIG. 1C). In some embodiments, one or more of the subassemblies can be provided in the form of one or more external components that operatively communicate with the system 100.

The camera module 106 includes one or more cameras for collecting image data as the system 100 traverses through an underground pipe system 101. The collected image data can include images, image files, videos, video files, calibration data, parameter data, validation data, raw data points, pixels, vectors, measurements, or similar information. In a first configuration, the camera module 106 is provided in the form of a stereo camera 128 and a monocular camera 130. In the first configuration, the stereo camera 128 is located at an opposite end of the collaborative robot with respect to the monocular camera 130. The stereo camera 128 is designed to capture image data of an area between the first robot 105 and the second robot 110, such that the stereo camera 128 of the first robot 105 is facing the stereo camera 128 of the second robot 110 as the system 100 traverses the underground pipe system 101. The monocular camera 130 is designed to capture image data of an area behind each of the first robot 105 and the second robot 110 as the collaborative robots traverse the underground pipe system 101. In some embodiments, the monocular camera 130 is activated for both the first robot 105 and the second robot 110. In some embodiments, the stereo camera 128 of only one of the first robot 105 or the second robot 110 is activated over a period of time. In this embodiment, when the stereo camera 128 is not activated, the laser module 108 is activated.

The laser module 108 is provided in the form of video simultaneous localization and mapping, or visual SLAM (vSLAM), for projecting a structured light laser 132 provided in the form of a temporary pattern. In some embodiments, the laser module 108 is located on the same end of the first robot 105 and the second robot 110 as the stereo camera 128. In at least this way, the laser module 108 allows the system 100 to accurately map features and identify defects even when the underground pipe system 101 does not have texture or does not have significant texture.

Figure 1C:
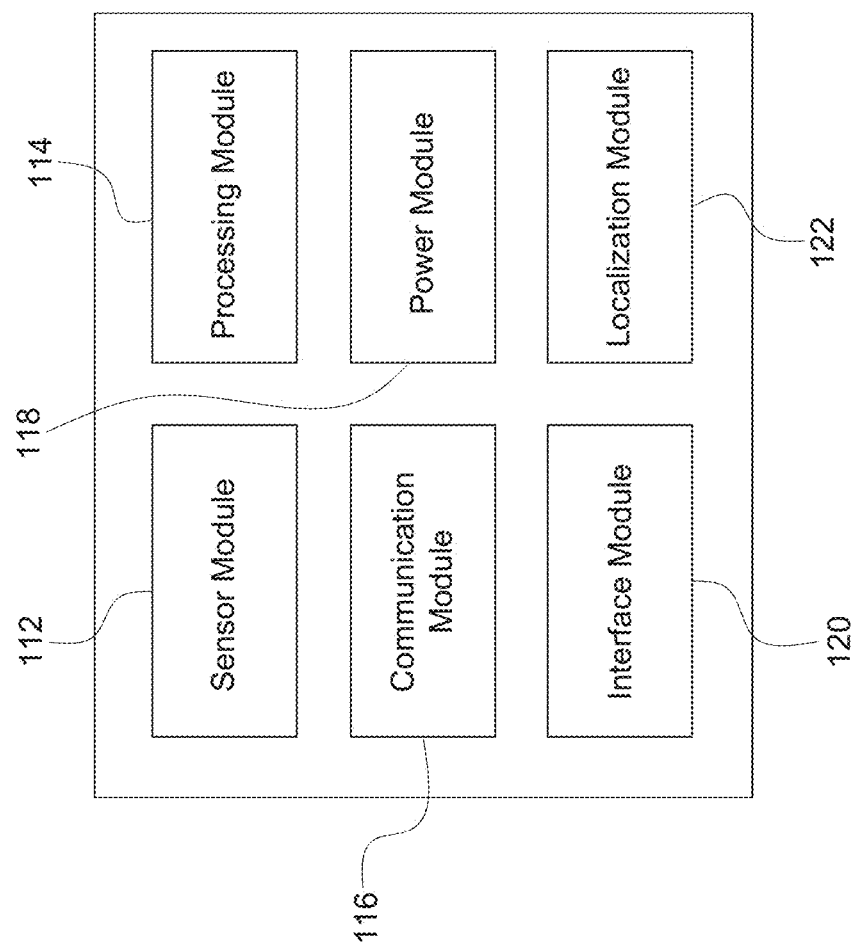
FIG. 1C is a block diagram of a control system of the collaborative robotic system of FIG. 1A according to an embodiment.

FIG. 1C is a block diagram of an example of the subassemblies that are provided in the form of one or more software and/or hardware components internal to the first robot 105 and the second robot 110. In some embodiments, the one or more of the subassemblies shown in FIG. 1C are included in an integrated control system of the collaborative robotic system.

In some aspects, the sensor module 112 is provided in the form of a sensor suite including one or more sensors or sensing devices designed to collect various types of data including, for example, data related to the operational characteristics of the system 100, data related to the underground pipe system 101, environmental and/or geographical data, and other types of data. The sensor module 112 can include multiple sensors of different types. In some embodiments, the sensor module 112 can be used in the data collection process. In some embodiments, the sensor module 112 may also be configured to monitor the status of the subassemblies of the first robot 105 and/or the second robot 110. The sensor module 112 can include one or more of a Global Positioning System (GPS) unit 865, an inertial measurement unit (IMU), an odometry unit, a camera, an encoder, a proximity sensor, etc.

In some embodiments, the processing module 114 can be provided in the form of an onboard processor and memory unit. Additional processors or other processing components may also be used in some embodiments. The processing module 114 allows for efficient processing of the data collected by the camera module 106, the laser module 108, the sensor module 112, the localization module 122, and other modules. In some embodiments, the processing module 114 can execute one or more steps associated with processing the collected data onboard the first robot 105 and/or the second robot 110. In some embodiments, the processing module 114 can be provided in the form of a remote server, processor, cloud computing device, or similar. In some embodiments, the processing module 114 is operatively coupled to the interface module 120 in order to display a 3D point map and features identified within the underground assets. The post-processing methods executed by the processing module 114 are described in more detail in connection with FIGS. 8 and 9.

The communication module 116 can be provided in the form of one or more wired or wireless antennas, ports, integrated circuit protocol, or other forms of communication disposed on or within the housing 102 of the first robot 105 and/or the second robot 110. In some configurations, the system 100 can include one or more devices to allow peripheral communication over multiple types of communication protocols, including but not limited to coax antennas, Bluetooth, satellite, cellular, Wi-Fi, internet, or other communication techniques and protocols. In some embodiments, the communication module 116 may include one or more ports for connecting other types of devices, such as a plug-and-play device, and/or one or more ports for connecting devices, like a USB device or HDMI, in a non-limiting example. It will be understood that the communication module 116 is designed to communicate and transmit information between one or more of the first robot 105, the second robot 110, other aspects of the system 100, the different modules and subassemblies of each collaborative robot of the system, 100, and also communicate with third-party applications and systems.

The power module 118 can be provided in the form of one or more rechargeable batteries, battery packs, power packs, wireless power banks, or similar. In some embodiments, the power module 118 is provided in the form of swappable battery packs or components that are otherwise removable to facilitate charging. In some embodiments, the power module 118 can include other power sources, including but not limited to hard-wire power, hydraulic, pneumatic, fuel, etc.

Figure 4:
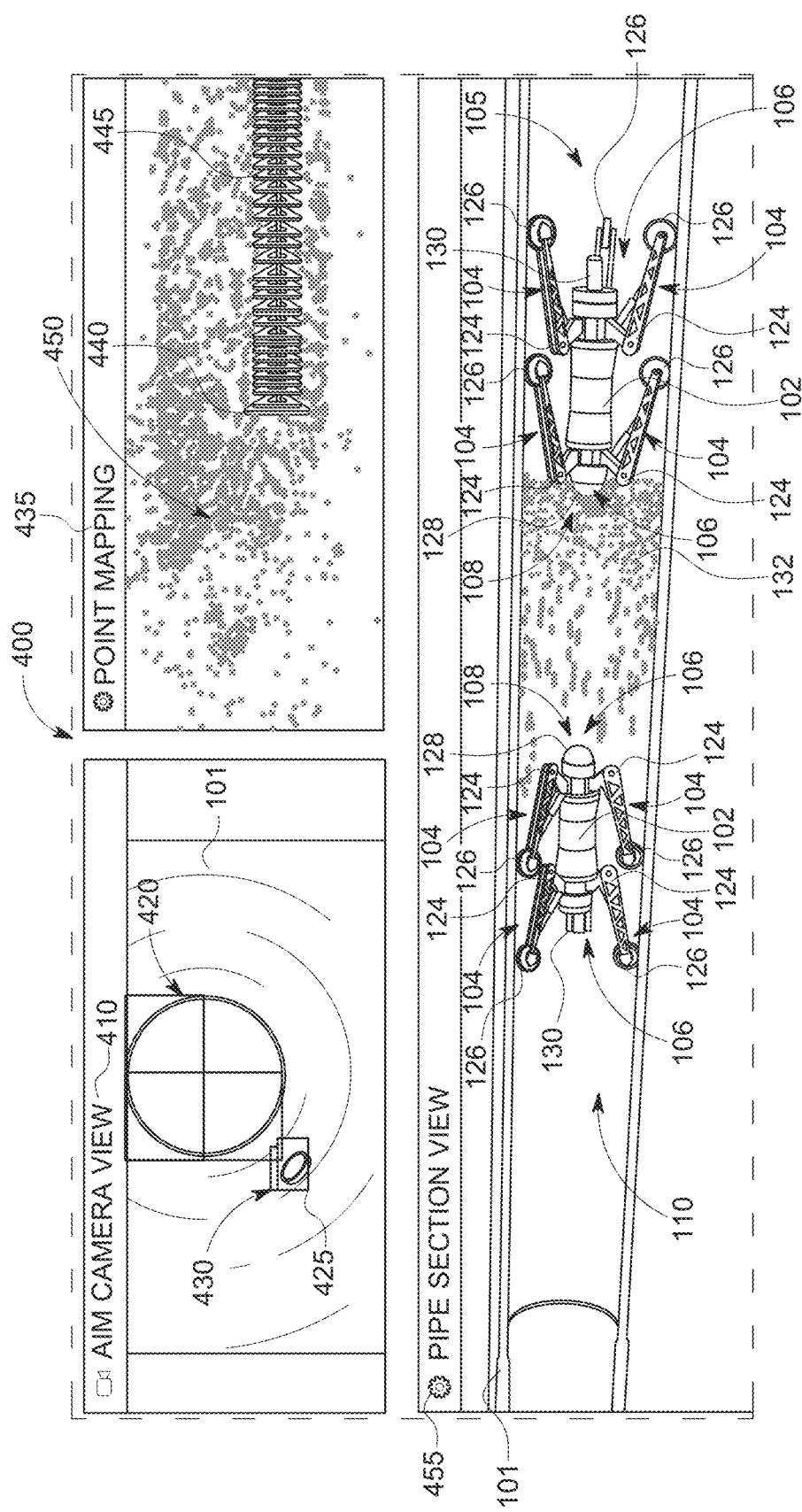
FIG. 4 is an exemplary illustration of a graphical user interface as the collaborative robotic system traverses through an interior of an underground pipe like FIG. 1A.
Figure 5:
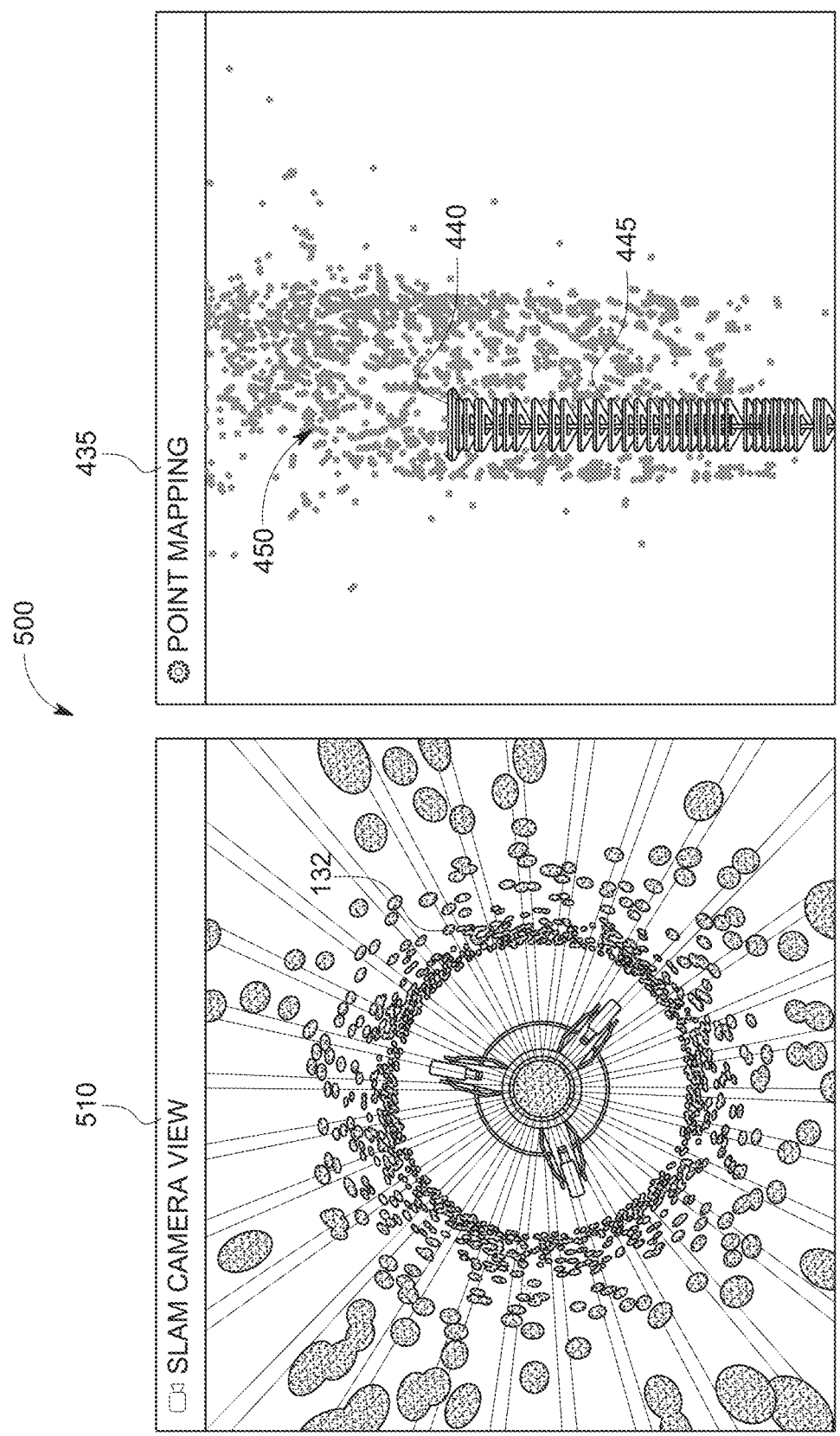
FIG. 5 is an exemplary illustration of a graphical user interface as the collaborative robotic system traverses through an interior of an underground pipe like FIG. 1A.

In some embodiments, the interface module 120 may include a digital display operatively coupled to, or otherwise in communication with, the system 100. The interface module 120 can include one or more display configurations, indicators, or similar. The interface module 120 can also include a computing device or computer display (not shown). The interface module 120 may include one or more displays for displaying the output of the processing module 114 and associated post-processing methods described herein. In some embodiments, as shown in FIG. 4, the interface module 120 can display a rear-camera view 410 of the pipe system 101 and a point mapping diagram 435 as the system 100 traverses through the pipe system 101. In some embodiments, as shown in FIG. 5, the interface module 120 can display a stereo camera view 510 and the point mapping diagram 435 as the system 100 traverses through the pipe system 101. The interface module 120 may also accept user input so the data and output information can be manipulated, edited, or otherwise modified during the processing methods. The interface module 120 can also include one or more remote control devices for controlling the system 100 and/or individual subassemblies.

In some embodiments, the system 100 may include the localization module 122. The localization module 122 can include but is not limited to GIS, GPS unit 865, IMU, wheel odometry, etc. In some embodiments, the localization module 122 can be provided in the form of a separate subassembly that can be used with, or installed on, an above-ground system to improve the data collection and processing techniques by implementing one or more of the advanced data collection and processing methods described herein without using the entire collaborative robot system 100.

In some embodiments, the localization module 122 can communicate with the encoders of the wheels 126 to track and process data related to the distance traveled by the system 100. The information and data collected by the encoders can be used by the processing module 114 to determine the location of one or more underground assets in the underground pipe system 101. In some configurations, the encoders can be in communication with one or more of the sensor module 112, processing module 114, or other modules/subassemblies.

In the configuration of FIGS. 1A and 1B, the first robot 105 is configured to operate in a laser mode with the laser module 108 activated and the second robot 110 is configured to operate in a camera mode with the stereo camera 128 of the camera module 106 activated. In a second configuration, the first robot 105 can operate in the camera mode and the second robot 110 can operate in the laser mode. In some embodiments, the system 100 can traverse the underground pipe system 101 without either the laser mode or camera mode activated and/or with both the laser mode and camera modes activated.

In use, as the system 100 traverses through the underground pipe system 101, the first robot 105 projects a structured light laser 132 using a laser module 108 while the second robot 110 captures images using a front stereo camera 128 of the camera module 106. In at least this way, the system 100 can detect and identify one or more features 425, defects, anomalies, or similar of the underground pipe system 101. In some embodiments, both the first robot 105 and the second robot 110 can capture images using a rear monocular camera 130 of the camera module 106 as the system 100 traverses through the underground pipe system 101. When the system 100 collects image data using the monocular camera 130 of the first robot 105 and the monocular camera 130 of the second robot 110, the image data is organized as a separate data set from the image data collected from the front stereo camera 128. The processes related to the detection, identification, and analysis of data collected by the system 100 are described in more detail in connection with FIGS. 4-13.

Figure 2:
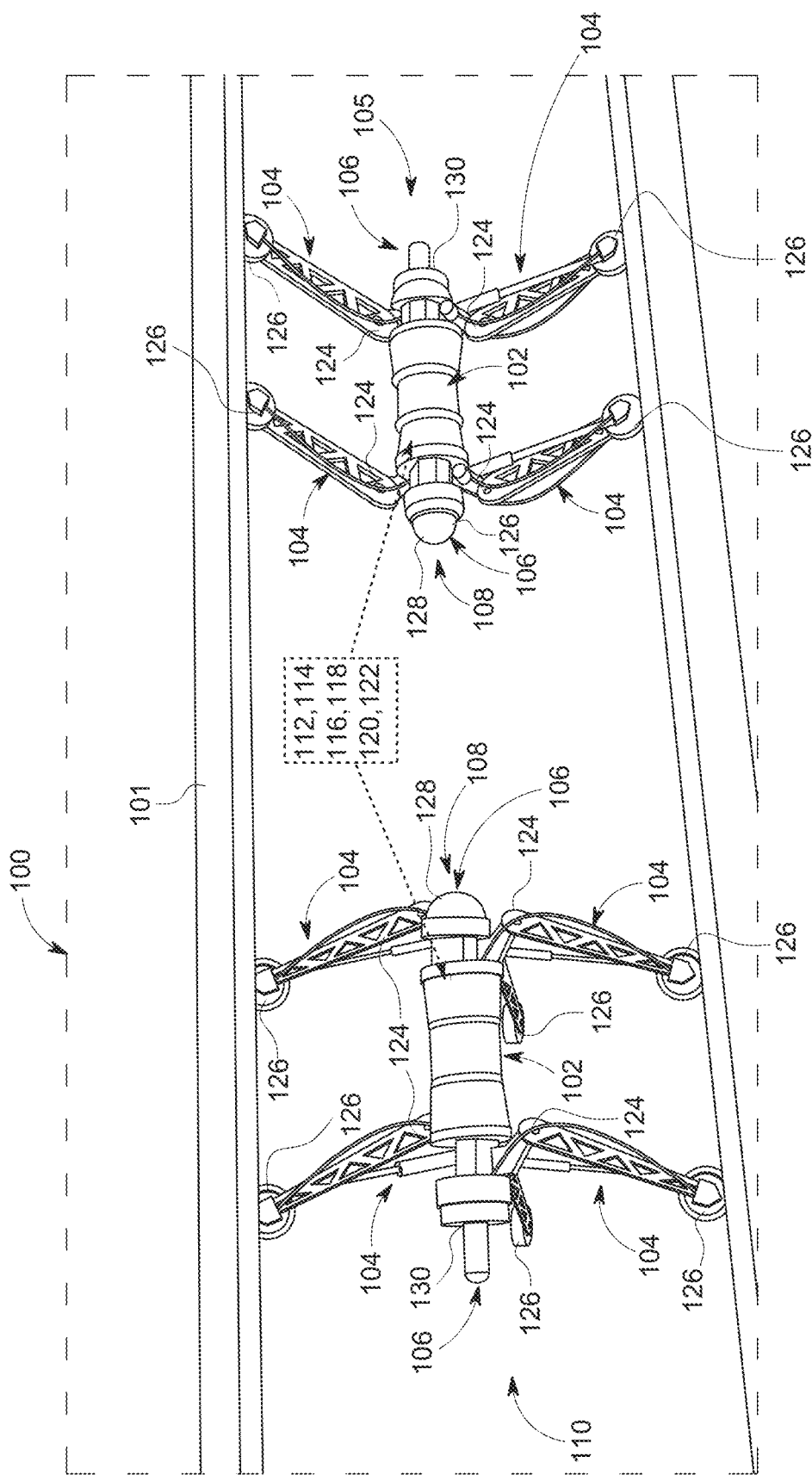
FIG. 2 is a partial isometric cross-sectional section view of an interior of an underground pipe with an increased diameter compared to FIG. 1A, illustrating one configuration of the dynamically expanded modular features of the collaborative robotic system.

FIG. 2 illustrates the system 100 traversing through an underground pipe system 101 of a larger diameter compared to the underground pipe system 101 of FIGS. 1A and 1B. While six extendable legs 104 and wheels 126 are shown in the configuration of the system 100, two along each side of the housing 102, and two on the bottom of the housing 102 other configurations and quantities of legs 104 and/or wheels 126 (or similar) are possible. In some embodiments, the sensor module 112 can include a proximity sensor, or similar, to detect a diameter of the pipe system 101. In this embodiment, the system 100 can automatically adjust the one or more extendable legs 104 based on the detected diameter of the pipe. In some embodiments, the legs 104 can be dynamically adjusted to allow the system 100 to maneuver through varying pipe diameters throughout the same underground pipe system 101.

Figure 3A:
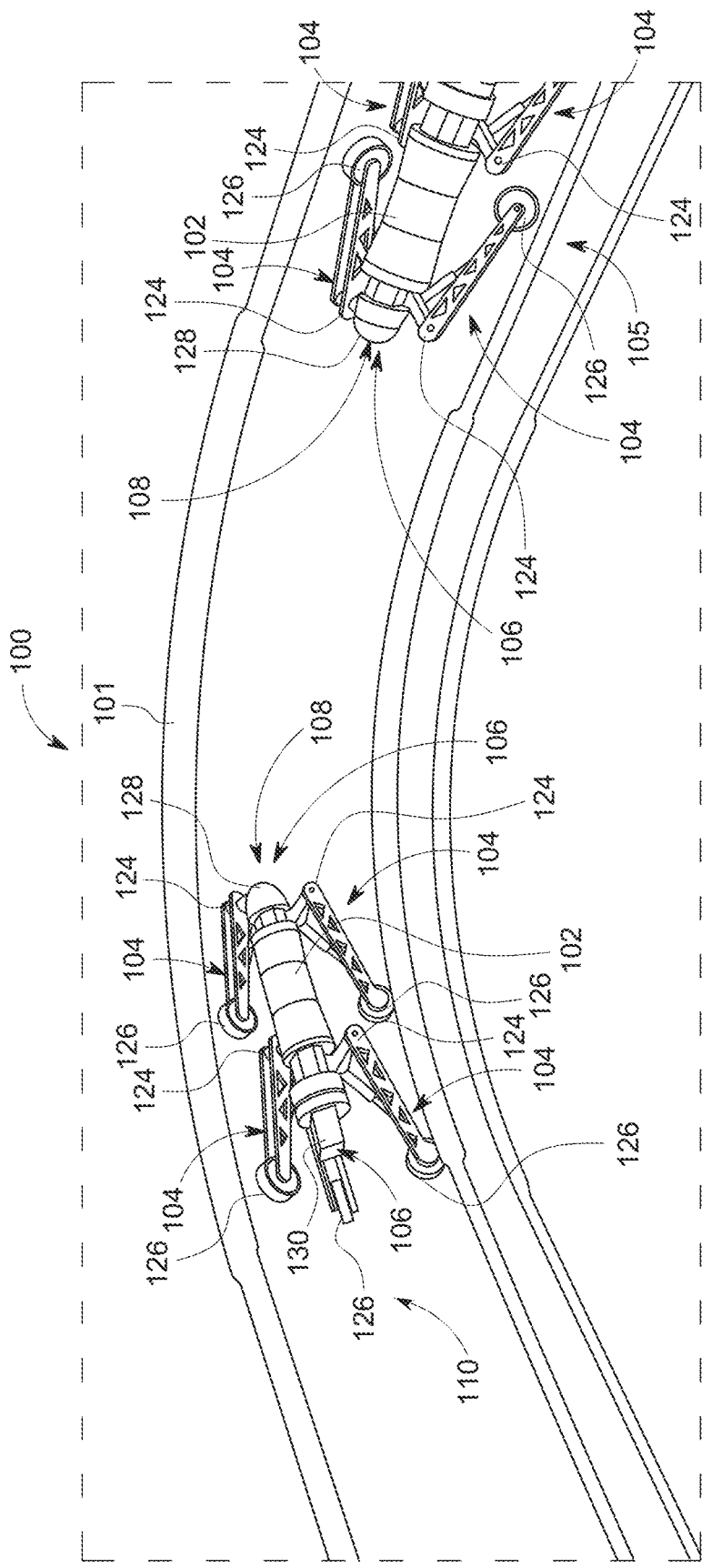
FIG. 3A is a partial side cross-sectional view of an interior of an underground pipe similar to the pipe of FIG. 1A further including a bend and illustrating the mobility features of the collaborative robotic system.
Figure 3B:
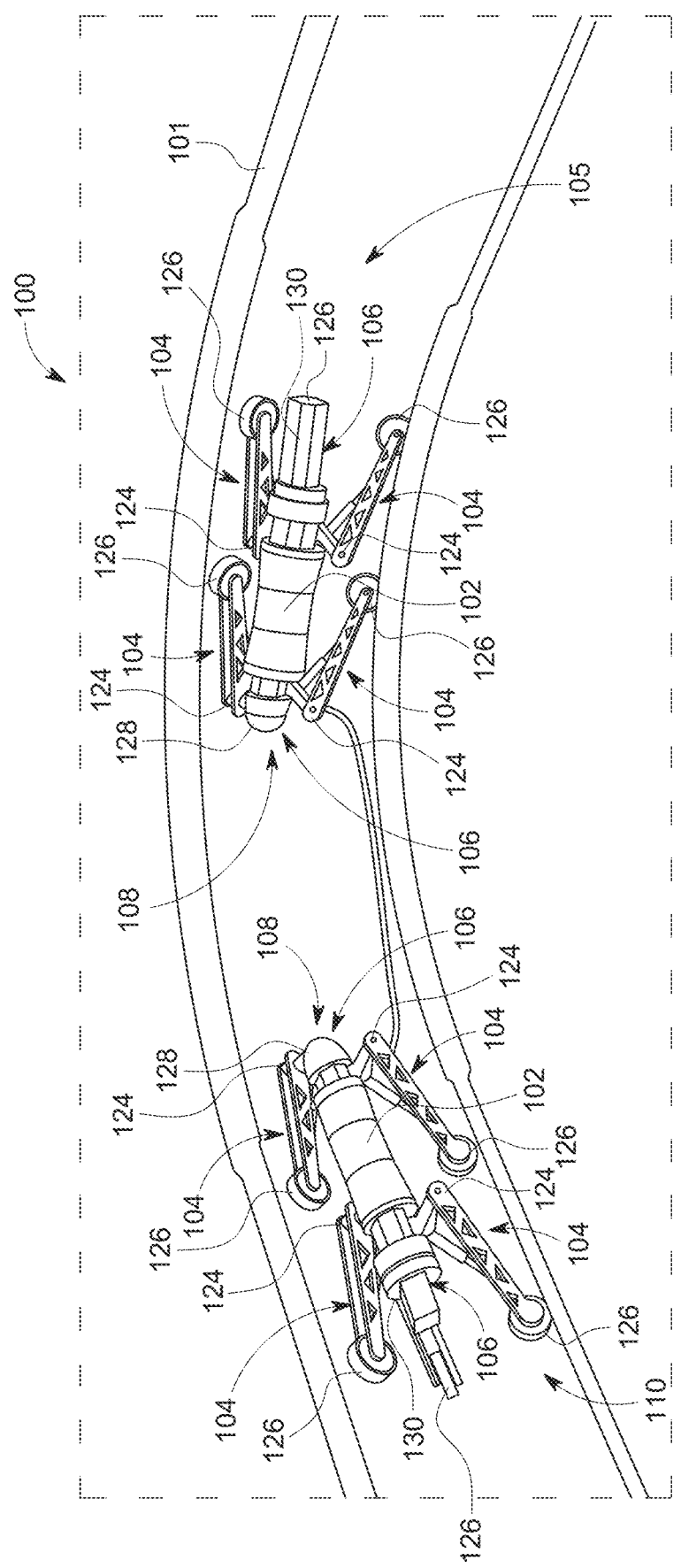
FIG. 3B is a partial side cross-sectional view of the collaborative robotic system traversing through the underground pipe of FIG. 3A.

FIGS. 3A and 3B illustrate the system 100 traversing through an underground pipe system 101 with a curve or bend. The legs 104 of the first robot 105 and the second robot 110 can be dynamically extended and contracted at the one or more hinges 124 to navigate through bends, elbows, tees, intersections, taps, and other configurations in the underground pipe system 101. In some embodiments, the sensor module 112 and/or camera module 106 can detect a bend or other change in the configuration of the pipe system 101. In one configuration, the system 100 can automatically adjust the one or more extendable legs 104 based on the detected configuration of the pipe. In some embodiments, the housing 102 is provided in the form of one or more jointed portions, or similar, to provide added flexibility as the system 100 traverses through the underground pipe system 101.

The system 100 can be used to generate a network digitization 400 of an underground pipe system 101 provided in the form of a natural gas network. An example of the network digitization 400 generated as an output of the system 100 is shown in FIG. 4. The network digitization 400 can be provided in the form of a rear-camera view 410, a 3D point map 435, and a pipe section view 455.

The rear-camera view 410 is generated from the image data collected from the monocular camera 130 of the one or more robots of the collaborative system 100, while the 3D point map 435 is generated from the image data collected from the stereo camera 128. The displayed outputs on the network digitization 400 can automatically update to show real-time camera footage in the rear-camera view 410 and the 3D point map 435 as the first robot 105 and the second robot 110 traverse through the underground pipe system 101. The dual camera system using the camera module 106 with the stereo camera 128 located on one end of the first robot 105 and the monocular camera 130 located on an opposite end of the first robot 105, allows the monocular camera 130 to collect image data of the pipe system 101 without interference from the light of the laser module 108.

In some embodiments, the rear-camera view 410 can be used for asset identification and mapping using an advanced training model. When used throughout the present disclosure, one skilled in the art will understand that the "advanced training model" can include machine learning processes, artificial intelligence processes, and other similar advanced machine learning processes. For example, the system and processes of the present disclosure can provide an objective classification of one or more features 425 of a pipe asset having different individualized parameters. The system can leverage the known characteristics of features with similar metrics as an input to an iterative training process for an automated detection and objective classification of a feature 425 based one or more parameters. In some forms, the objective classification is identified using objective classification boundary boxes 420. In some embodiments, the advanced training model is iteratively trained using one or more inputs, including but not limited to data sets comprising video or other image data. In some embodiments, this image data includes robot data, which can include video footage or other images captured by a robotic system (e.g., CISBOT, PRX Cameras, etc.).

In a non-limiting embodiment, a feature 425 can include a tap, a joint, a crack, an elbow, a tee, a cross-bore, corrosion, a valve, etc. The system 100 can generate an identifier 430 provided in the form of a feature label, or similar. In some embodiments, the identifier 430 can be provided in the form of a general classification of the feature (e.g., a tap, a joint, a crack, an elbow, a tee, a cross-bore, corrosion, a valve, etc.). In some embodiments, the identifier 430 can be provided in the form of a unique identifier that is specific to that feature (e.g., serial number, barcode, QR code, a label that is unrepeated in an inventory or list of identified features, etc.).

The 3D point map 435 is generated from the vSLAM of the laser module 108 and the stereo camera 128 of the camera module 106. The 3D point map 435 can include the current location 440 of the system 100, a travel path 445 for the system, and a point cloud 450 of the underground pipe system 101. The 3D point map 435 and the pipe section view 455 can automatically update to show real-time location data as the first robot 105 and the second robot 110 traverse through the underground pipe system 101.

FIG. 5 illustrates an alternative output 500 of the system 100, including one or more graphics that can be generated on the interface module 120. The graphics are generated as the collaborative robotic system moves through an underground pipe. The alternative output 500 can include a front camera view 510 generated from the front-facing stereo camera 128. The embodiment shown in FIG. 5 illustrates a vSLAM camera view from the stereo camera 128 of one robot capturing image data related to the projected light pattern of the structured light laser 132 of the laser module 108. The image data captured from the stereo camera 128 can then be processed and used to generate the point cloud 450 of the 3D point map 435. In some forms, the 3D point map 435 is a vertical orientation of the 3D point map 435 shown in FIG. 4.

Figure 6:
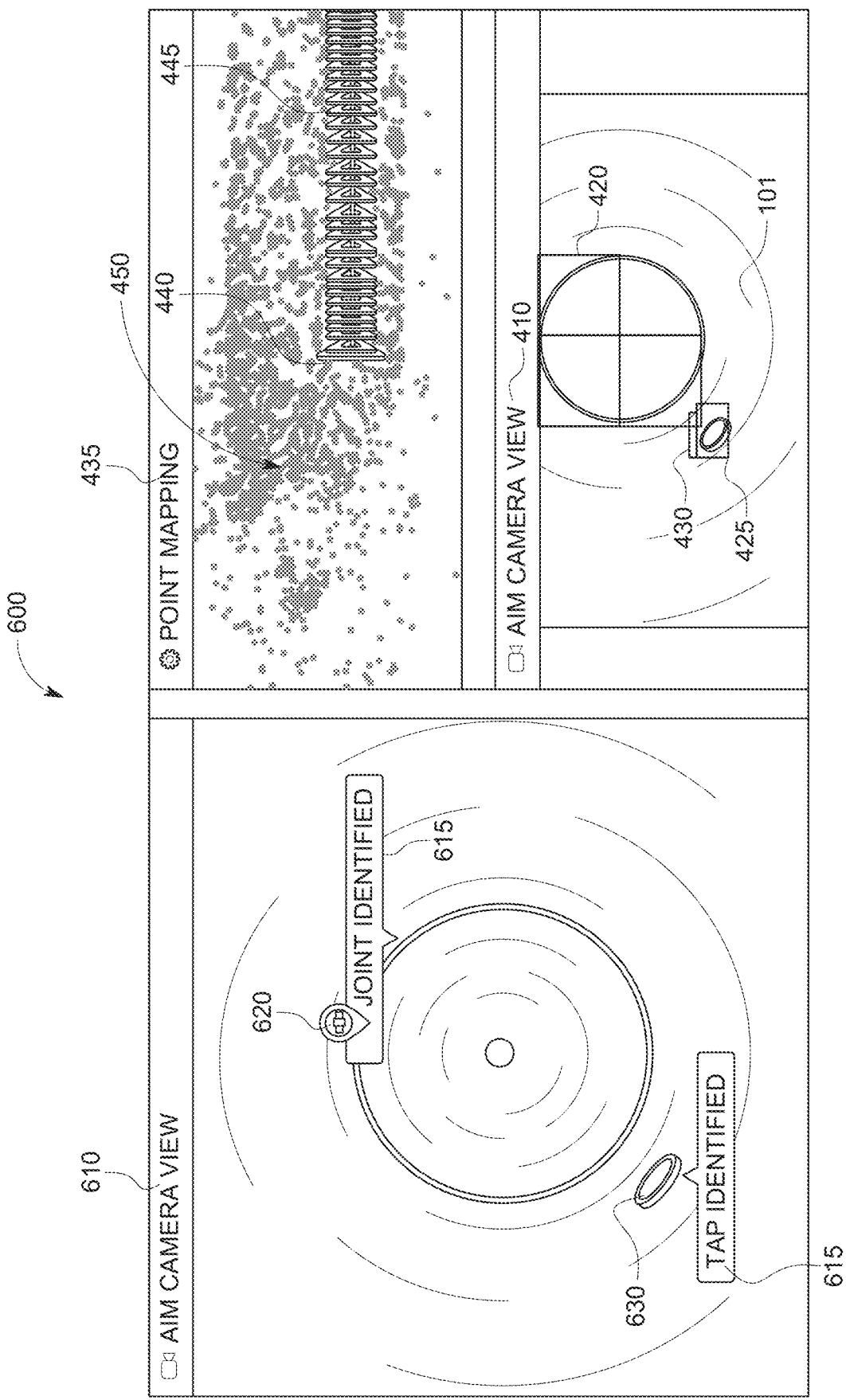
FIG. 6 is an exemplary illustration of a graphical user interface as the collaborative robotic system traverses through an interior of an underground pipe like FIG. 1A.

FIG. 6 illustrates a feature identification output 600 of the system 100, including one or more graphics that can be generated on the interface module 120. The real-time footage from the rear-camera view 410 and an updated 3D point map 435 can be displayed as the first robot 105 and the second robot 110 traverses through the pipe system 101. The advanced training model performs the steps of asset identification and mapping, described in more detail in connection with FIG. 8. The system 100 can provide objective classification for one or more features 425 of a pipe asset in the rear-camera view 410. An alternative asset identification model (AIM) camera view 610 of the monocular camera 130 can display the one or more features 425 without the objective classification boundary boxes 420. In the alternative AIM camera view 610, a feature classification 615 can be provided as a tag for each type of feature. In some embodiments, the feature classification 615 can be the same label as the identifier 430 or can have a different label. In some embodiments, the feature classification 615 can include a general classification for the type of feature (e.g., a tap, a joint, a crack, an elbow, a tee, a cross-bore, corrosion, a valve, etc.). In the non-limiting example shown in the alternative AIM camera view 610, a feature classification 615 can include "Joint Identified" with a graphic icon 620 of a joint, wherein the feature classification 615 is pointing to a feature 425 provided in the form of a pipe joint 625 of the underground pipe system 101, as identified by the asset identification and mapping objective classification using objective classification boundary boxes 420 in the rear-camera view 410. A second feature classification 615 can be provided to include "Tap Identified" pointing to a feature 425 provided in the form of a tap 630 of the underground pipe system 101. The locations of the one or more features 425 identified and shown in the alternative AIM camera view 610 can be correlated with GIS information using the localization module 122 to identify a geographic location for each of the one or more features, as shown and described in connection with FIG. 7.

Figure 7A:
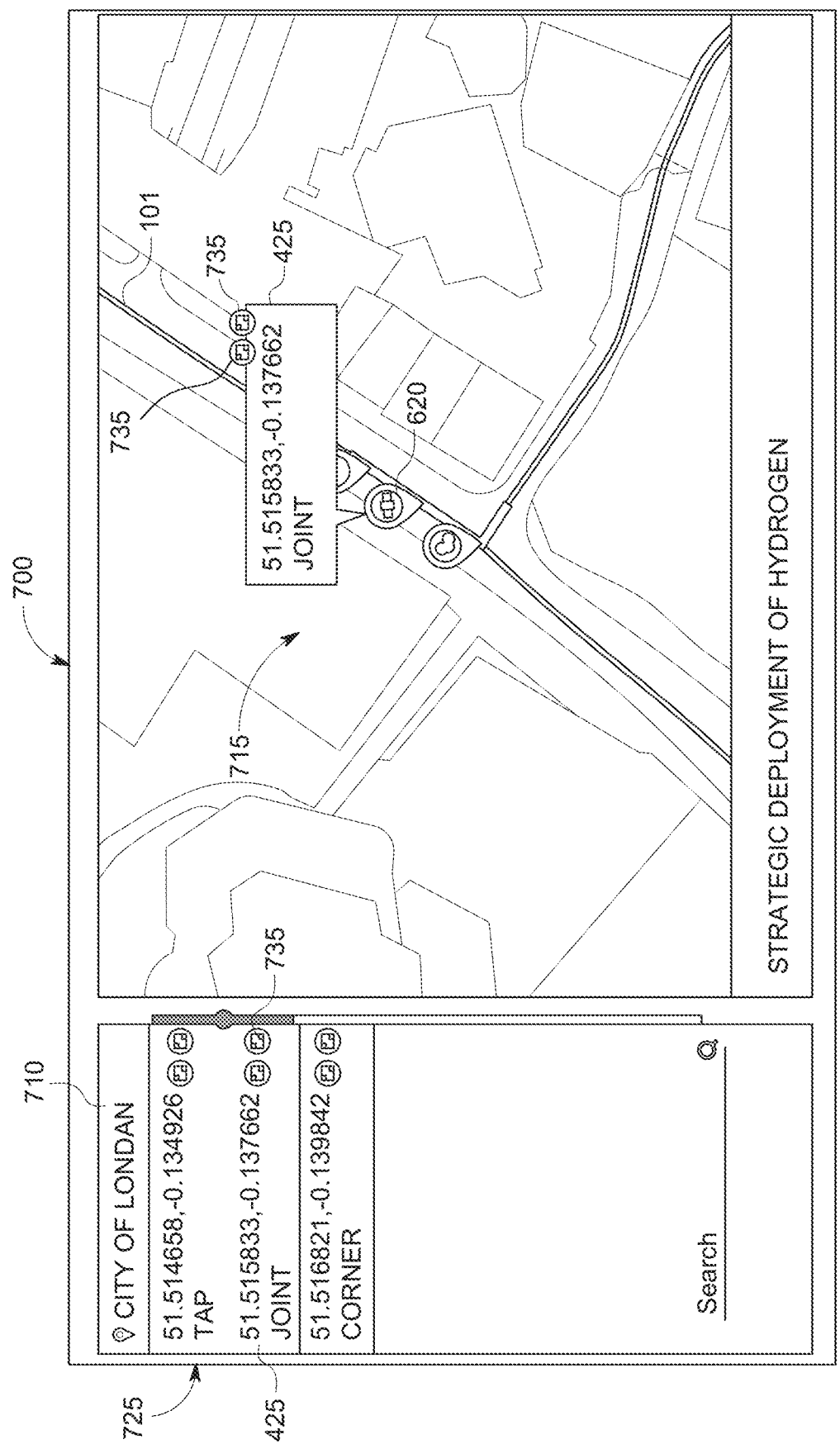
FIG. 7A is an exemplary illustration of a visual output of an automated GIS localization feature of the collaborative robotic system as it moves through an underground pipe, as shown in FIG. 1A.
Figure 7B:
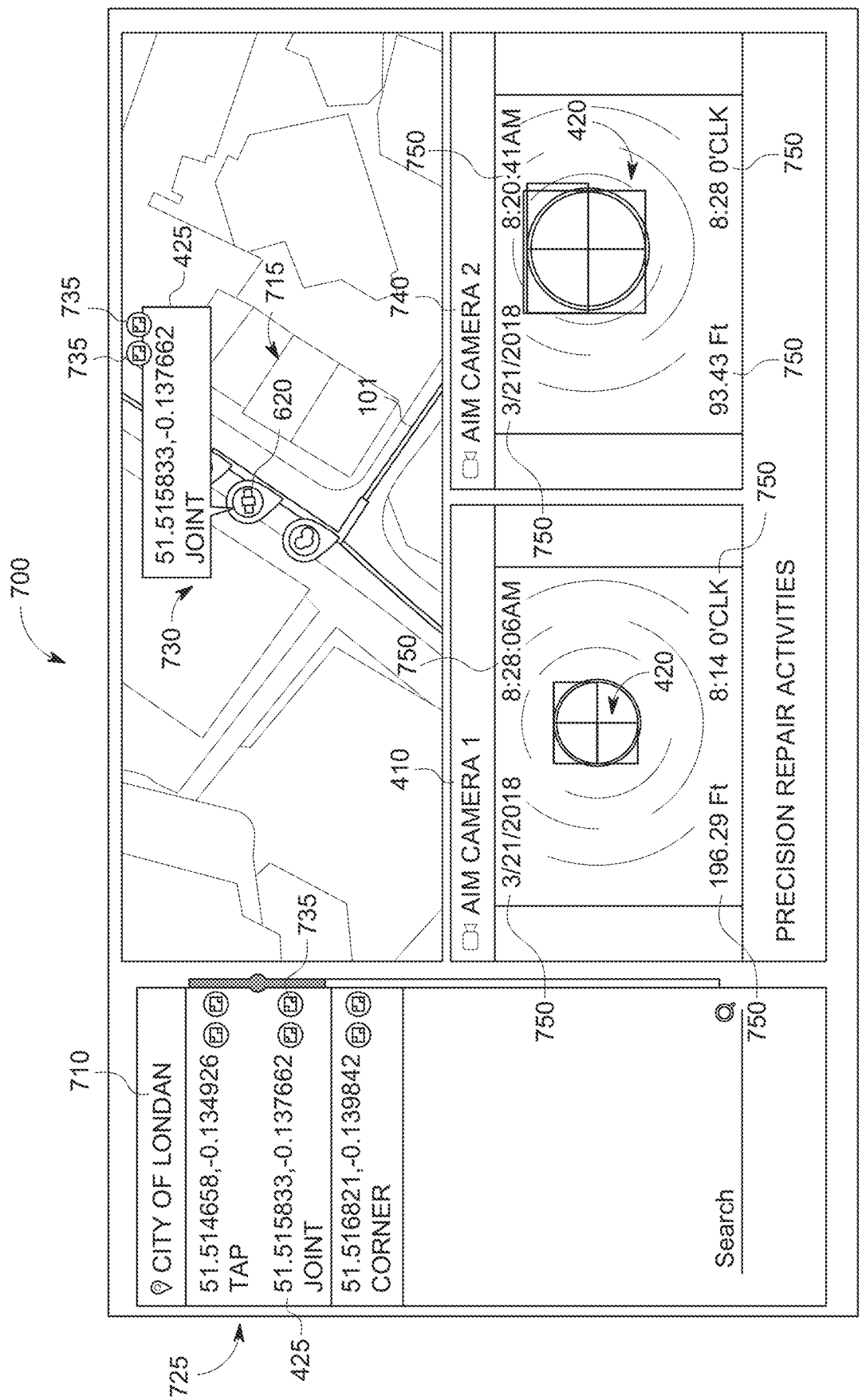
FIG. 7B is an exemplary illustration of an expanded visual output of 7A.

FIGS. 7A and 7B illustrate an exemplary visual output of the localization module 122 displayed on the interface module 120. In the example shown, the visual output can include an interactive map 715 of an overview of the underground pipe system 101 for a geographic region 710. In some embodiments, a user can select a different geographic region 710 and the map 715 will automatically update to show the area selected. The map 715 can include a graphic icon 620 for each feature 425 identified within the asset. The features 425 identified in the asset identification mapping process can be extracted and displayed in a list 725, as shown on the left view of the visual output 700. In some embodiments, as shown in FIGS. 7A and 7B, the list 725 of identified features 425 can include a location for the asset, provided in the form of coordinates. In some embodiments, a user can select (e.g., click, touch, etc.) the graphic icon 620 to generate a pop-up or similar with additional details 730 related to the identified feature(s) 425. In some embodiments, the additional details 730 are the same information displayed in the list 725 for each feature 425. In some embodiments, the additional details 730 can include one or more linked image files 735 associated with the identified feature 425. As shown in FIG. 7B, the image files 735 can include a visual output of a first AIM rear-camera view 410 from the monocular camera 130 of the first robot 105 and a visual output of a second AIM camera view 740 from the monocular camera 130 of the second robot 110. The visual outputs can further include the objective classification of the one or more identified features 425 and additional feature metrics 750. The feature metrics 750 can include but are not limited to an image capture date, time, footage, location, etc. In some embodiments, video footage or other image data can be used as input training data into one or more advanced training models. The input data can include one or more metrics or features related to substantive information captured by the imaging system, as well as metrics or features related to the image capture system (e.g., camera orientation, clock position, time stamp, image rotation, etc.). Other feature metrics 750 are contemplated within the scope of the present disclosure. In some embodiments, a user can customize the feature metrics 750 displayed based on or more user settings and/or system configuration settings.

Figure 8:
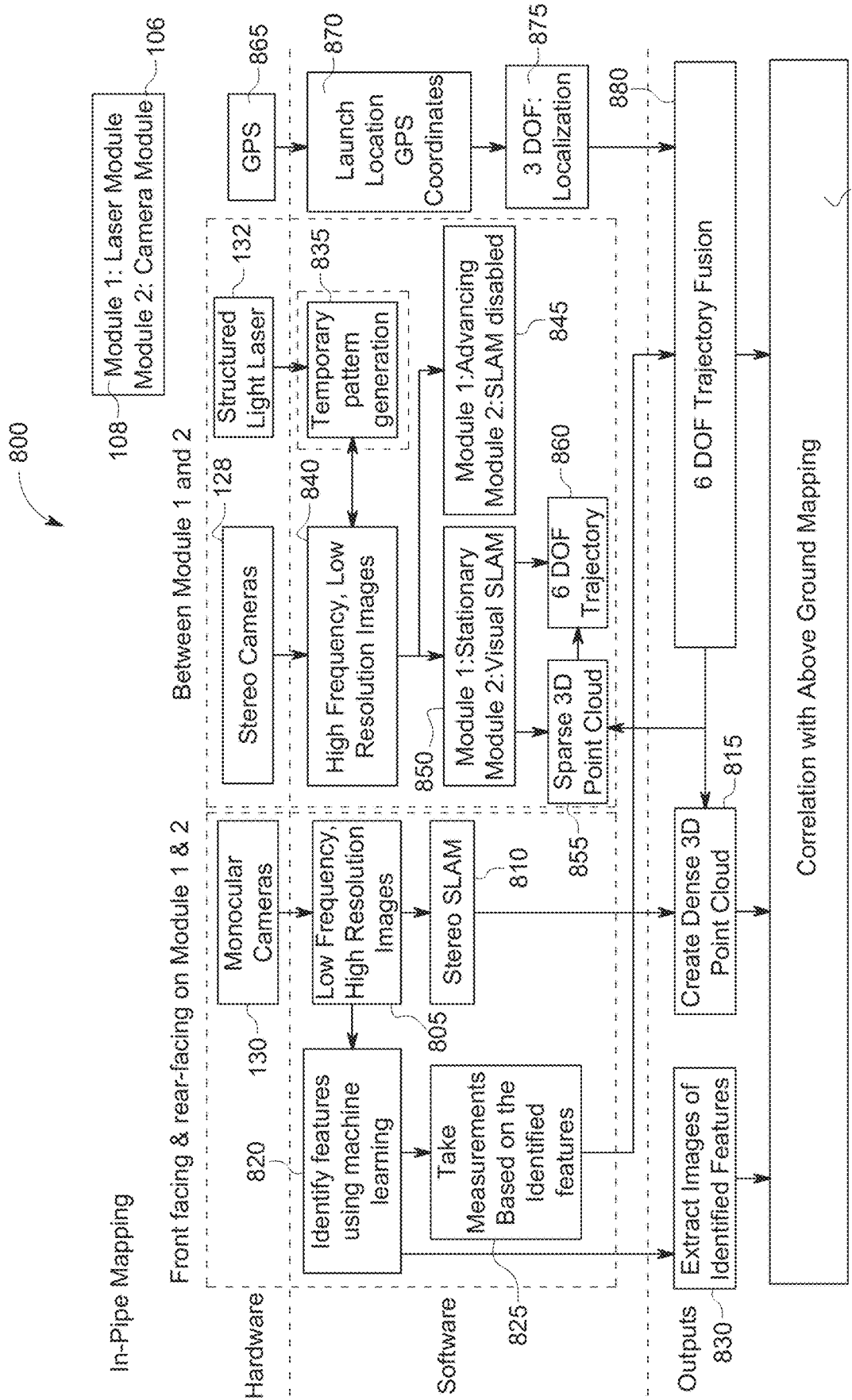
FIG. 8 is a flow diagram describing the process of 3D mapping as the collaborative robotic system moves through an underground pipe, as shown in FIG. 1A.

FIG. 8 is an illustrative flow diagram of the system and processes for an in-pipe mapping process 800 to efficiently and accurately identify one or more features 425 of an underground pipe system 101 using the collaborative robot system 100. In some embodiments, the steps of the in-pipe mapping process 800 are executed by the processing module 114, although other subassemblies and/or system 100 components can be configured to execute the process(es) described herein. The in-pipe mapping process 800 includes the analysis of data collected from the camera module 106 and the laser module 108 using an advanced training model to identify one or more features 425 of the underground pipe system 101. The identified features 425 can be extracted and correlated with an above-ground map via the localization module 122.

In the configuration of the system 100 described in connection with FIG. 8, the references to "Module 1" corresponds to the hardware and software components of the first robot 105, whereas "Module 2" corresponds to the hardware and software components of the second robot 110. As described above in connection with FIG. 1, in some configurations, the laser module 108 of the first robot 105 is activated while the camera module 106 of the second robot 110 is activated.

As the system traverses through the pipe system 101, the monocular camera 130 of both the first robot 105 and the second robot 110 collects image data, including low-frequency, high-resolution images at step 805. The stereo vSLAM system receives and processes the collected image data at step 810 and generates a dense 3D point cloud at step 815, including the 3D point cloud 435 shown in FIGS. 4-6. The low-frequency high-resolution images collected at step 805 can be processed by the advanced training model at step 820 for objective object identification and detection of one or more features 425, as described in connection with FIG. 4. The identified features can be measured at step 825 using the advanced training model in step 820 and/or other image processing techniques. The image data containing the identified feature(s) can be extracted at step 830.

As the system traverses through the pipe system 101, the laser module 108 of the first robot 105 can use a structured light laser 132, as shown in FIG. 2, to generate a temporary light pattern at step 835, wherein the temporary light pattern is projected on an interior surface of the underground pipe system in an area between the first robot 105 and the second robot 110. The stereo camera 128 of the camera module 106 of the second robot 110 can collect high-frequency, low-resolution images of the projected light pattern at step 840. In some configurations, the first robot 105 moves toward the second robot 110, while the second robot 110 remains stationary, as shown in step 845. This can allow for precise location detection as the collaborative system 100 moves through the pipe system 101. At step 845, the first robot 105 the stereo camera 128 and vSLAM of the second robot 110 are disabled. At step 850, the first robot 105 is stationary while the stereo camera 128 and vSLAM are activated. As the collected images are processed by the vSLAM, the system 100 can generate a sparse 3D cloud at step 855, including the projected points of the structured light laser 132, as shown in the 3D dense point cloud images 435 shown in FIGS. 4-6. The processed images and/or information from the sparse 3D point cloud can be used to create a 6 degree of freedom (DOF) trajectory at 860.

The system 100 also includes a GPS unit 865. In some embodiments, the GPS unit 865 can be provided in the form of a standalone device communicatively coupled to the system 100. In some embodiments, the GPS unit 865 can be included in the sensor module 112, and/or within the localization module 122 of the system 100. At step 870, the GPS unit 865 is initiated and the system launches location GPS coordinates. At step 875, the location GPS coordinates are processed for a 3 DOF localization. The 3 DOF localization produced at step 875 can be further processed with the 6 DOF trajectory created at step 860 for a 6 DOF trajectory fusion at step 880. The 6 DOF trajectory fusion generated at step 880 can be used to further refine one or more of the sparse 3D point cloud created at step 855 and/or the dense 3D point cloud created at step 815.

At step 885, the outputs of the in-pipe mapping process 800, including but not limited to the extracted images of the identified features from step 830, the dense 3D point cloud created at step 815, and the 6 DOF trajectory fusion created at step 880, can be combined and further processed to correlate the data points and information with the above ground mapping at step 885. In some embodiments, the step 885 is executed by the localization module 122, although the step 885 can be executed by the processing module 114 or other subassemblies/components in some configurations.

Figure 9:
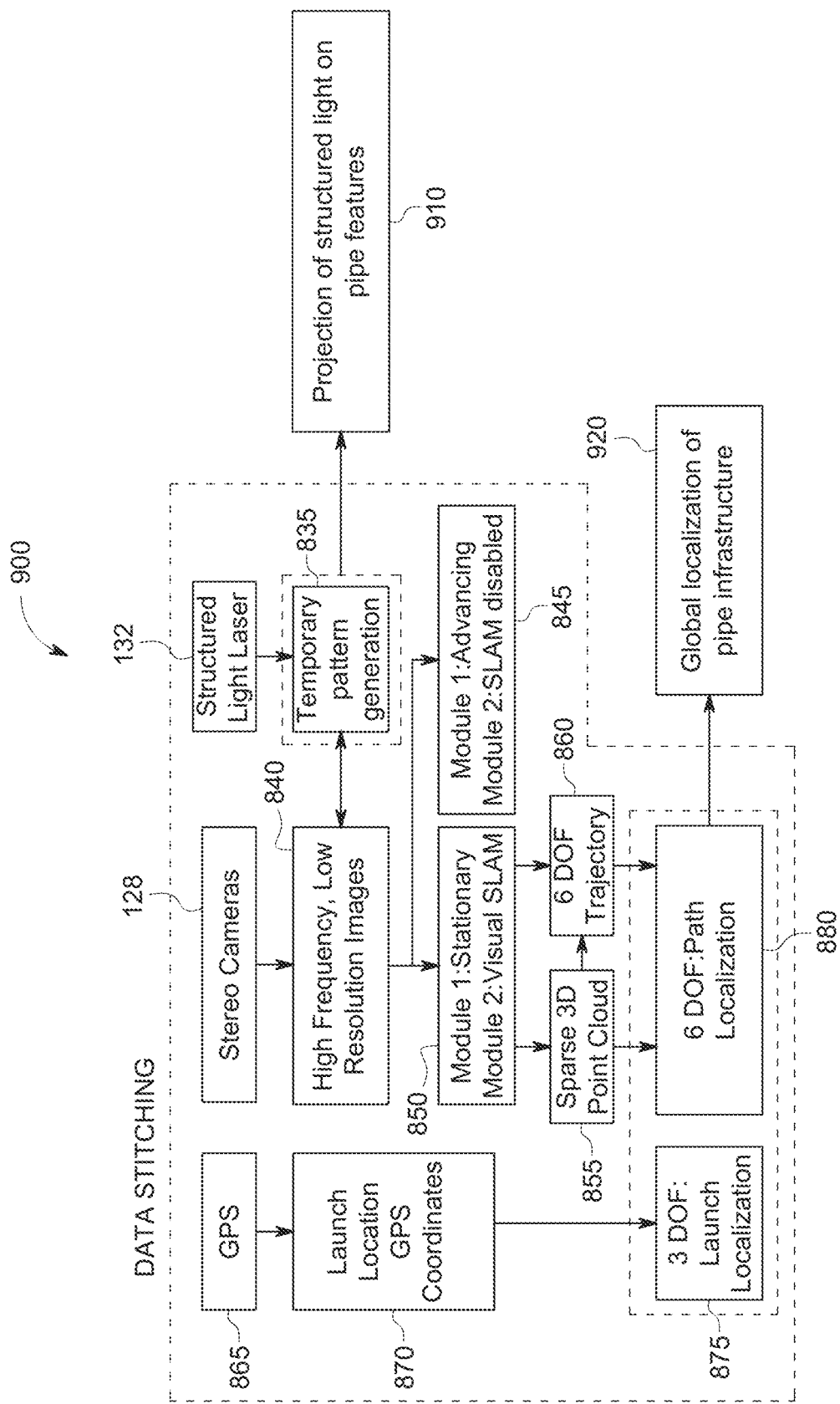
FIG. 9 is a flow diagram describing the process of data stitching as the collaborative robotic system moves through an underground pipe, as shown in FIG. 1A.

In some embodiments, the in-pipe data mapping process 800 is performed across multiple pipe segments and/or assets of an underground pipe system 101. As shown in FIG. 9, the data collected and information processed via the in-pipe data mapping process 800 is stitched together using a data stitching process 900. In at least this way, at step 910, the identified pipe features 425 including tees, wyes, etc., in each segment of the pipe system 101, can be stitched together, or otherwise correlated based on identified locations to generate a connected map of the underground pipe system 101 network and a complete global localization of the pipe infrastructure at step 920. The output of the global localization from step 920 can include visual graphics of the pipe system as shown overlaid on the map of FIGS. 7A and 7B, in some non-limiting configurations.

Figure 10:
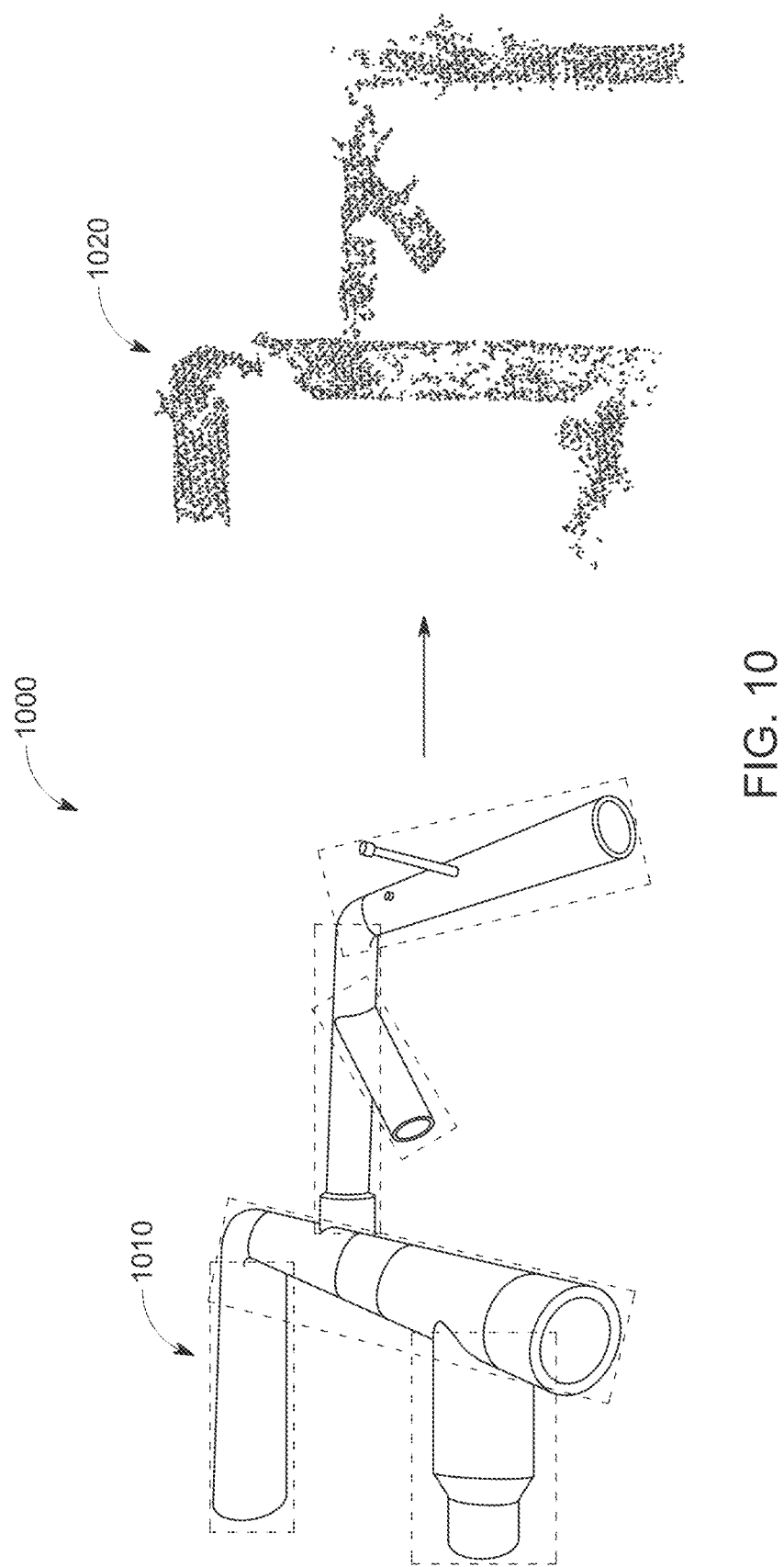
FIG. 10 is a visual representation of the 3D point mapping of multiple branches of pipe of varying diameter, according to one embodiment.

FIG. 10 is a visual representation of the 3D point mapping of multiple branches of pipe of varying diameter, according to one embodiment. In this representation, 1010 is an above-ground exemplary model of a pipe system network, with boundary boxes indicating different segments of the pipe system, each of which can be analyzed using the in-pipe mapping process 800. The output of the in-pipe mapping process 800, can include a 3D point cloud for each individual segment of the pipe network, which can then be stitched together to generate a dense 3D point cloud system for the overall network, as shown in 1020. In this example, the system 100 can utilize the advanced training model to identify holes in the dense point cloud to further refine the location of specific features, like elbows and tees, in some examples.

In other embodiments, other configurations are possible. For example, those of skill in the art will recognize, according to the principles and concepts disclosed herein, that various combinations, sub-combinations, and substitutions of the components discussed above can provide appropriate control for a variety of different configurations of robotic systems for a variety of applications.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A collaborative robotic system for mapping underground assets comprising:
   a first robot and a second robot, each of the first robot and the second robot including:
      a housing including two or more extendable legs;
      a camera module;
      a laser module designed to project a structured light pattern;
      a sensor module designed to collect images from the camera module;
      a processing module including a processor and a memory unit, wherein the processing module is designed to process data collected from the sensor module; and
      a communication module designed to connect to an interface module.

2. The robotic system of claim 1, wherein each extendable leg is coupled to a movement device provided in the form of a wheel.

3. The robotic system of claim 1, wherein the camera module includes a stereo camera and a monocular camera.

4. The robotic system of claim 3, wherein the stereo camera is arranged on a first end of the first robot and the monocular camera is arranged on a second end of the first robot, wherein the first end is opposite the second end.

5. The robotic system of claim 1, wherein each autonomous robot includes four extendable legs.

6. The robotic system of claim 1, wherein each of the first robot and the second robot further comprises a power module.

7. The robotic system of claim 1 further comprising a Geographic Information System (GIS) logging output system designed to map a network of underground infrastructure and identify locations of different types of underground assets.

8. The robotic system of claim 1, wherein the processing module is further designed to execute a three-dimensional (3D) mapping process.

9. A method for detecting and locating underground assets using a robotic system, the method comprising:
providing a collaborative robotic system provided in a form of two or more autonomous robots, each of the two or more autonomous robots including a laser module, a camera module, a processing module, and one or more dynamically extendable legs;
initiating the laser module as the collaborative robotic system travels through a pipe;
projecting a pattern of light using the laser module;
collecting image data using the camera module as the collaborative robotic system travels through the pipe;
processing the image data from the camera module using the processing module; and
generating a visual output of one or more underground assets identified from the data processing step.

10. The method of claim 9, further comprising:
identifying features of the pipe using an advanced training model; and
generating a point cloud based on a location of the collaborative robotic system in the pipe.

11. The method of claim 9, wherein the pattern of light is projected onto an interior surface of the pipe.

12. The method of claim 9, wherein the visual output includes a dense three-dimensional (3D) point cloud.

13. A method for detecting and locating underground assets using a collaborative robotic system, the method comprising:
initiating a laser module of a first robot of the collaborative robotic system;
projecting a pattern of light on an interior of a pipe using the laser module of the first robot as the collaborative robotic system travels through the interior of the pipe;
collecting image data using a camera module of a second robot as the collaborative robotic system travels through the interior of the pipe;
collecting sensor data using a sensor module of the first robot;
processing the image data and the sensor data using a processing module of the collaborative robotic system; and
identifying one or more underground assets based on the processing data step.

14. The method of claim 13 further comprising:
stitching the image data and the sensor data using the processing module;
correlating the stitched data with above ground Geographic Information System (GIS) data; and
generating a visual output of a location associated with the one or more underground assets identified.

15. The method of claim 13 further comprising:
collecting a first image data using a monocular camera of the camera module; and
collecting a second image data using a stereo camera of the camera module.

16. The method of claim 13 further comprising:
initiating a localization module of the collaborative robotic system including a Global Positioning System (GPS) unit; and
determining a global localization of the one or more underground assets using the GPS unit.

17. The method of claim 16 further comprising:
generating a three-dimensional (3D) point cloud based on the processing of the image data and the sensor data;
identifying a hole in the 3D point cloud by an advanced training model;
determining the global localization associated with the hole in the 3D point cloud;
stitching together one or more 3D point clouds based on the global localization of the one or more underground assets compared to the global localization determination; and
generating a visual output of a network of the one or more underground assets.

18. The method of claim 13 further comprising:
projecting the pattern of light on the pipe interior using the first robot while the first robot remains stationary; and
collecting the image data using the second robot as the second robot moves away from the first robot.

19. The method of claim 13 further comprising:
identifying one or more features of the one or more underground assets using an advanced training model.

20. The method of claim 19 further comprising:
labeling the one or more identified features using the advanced training model; and
determining a location of the one or more identified features using a GIS module of the collaborative robotic system.

* * * * *